United States Patent Office 3,441,619
Patented Apr. 29, 1969

3,441,619
FLUORONITROALKANES AND METHOD
David M. Gardner, North Wales, Robert E. Oesterling,
Flourtown, and Edward A. Tyczkowski, Willow Grove,
Pa., assignors to Pennsalt Chemicals Corporation, Philadelphia, Pa., a corporation of Pennsylvania
No Drawing. Filed Oct. 11, 1961, Ser. No. 144,814
Int. Cl. C07c 79/12
U.S. Cl. 260—644   9 Claims This invention relates to novel chemical compositions useful as oxidizers for high energy chemicals in propellants. More particularly, this invention deals with fluoronitroalkanes having the structural formula $$X-\underset{NO_2}{\underset{|}{C}}-F \atop {}^{NO_2}$$

where X is a radical selected from the group consisting of —$NO_2$ and $$F-\underset{NO_2}{\underset{|}{C}}- \atop {}^{NO_2}$$

radicals. Thus, this invention embraces fluorotrinitromethane [$CF(NO_2)_3$] and difluorotetranitroethane [$CF(NO_2)_2$—$CF(NO_2)_2$].

In U.S. 2,486,023 there is disclosed a method for the preparation of aliphatic halohydrocarbons and halocarbons which involves replacement of the nitro group of a nitroalkane by the action of a halogenating agent. Thus, for example, an α-halogen containing nitroalkane is treated with a fluorinating agent such as HF, $SbF_3$, or $SbF_5$ whereby the nitro group is replaced by fluorine. Likewise, our own work has shown the nitro group of halogenated methanes to be replaced by HF and a catalyst or by elemental fluorine. For example, dibromodinitromethane [$CBr_2(NO_2)_2$] yields $CF_4$, $C(NO_2)_4$, and $CBr_2F_2$ when treated with fluorinating agents. In an attempt to obtain fluorotrinitromethane, we stirred tetranitromethane in water and treated it at 0° C. with fluorine diluted with helium. However, the product was largely $CF_4$ and no fluorotrinitromethane could be isolated. Thus, the prior art teachings are of no value for the preparation of compounds of this type.

It is also known to prepare 1,1,2,2-tetrafluorodinitroethane, $O_2N$—$CF_2$—$CF_2$—$NO_2$, by the addition of nitrogen tetroxide to tetrafluoroethylene (U.S. 2,447,504), but fluorinated ethanes containing more than two nitro groups cannot be prepared by this method.

We have now found that the novel compounds fluorotrinitromethane and 1,2-difluorotetranitroethane can be prepared in accord with this invention by reacting elemental fluorine with an alkali metal salt of the polynitroalkane (e.g. M—$C(NO_2)_3$ and $$M—C(NO_2)_2—C(NO_2)_2—M$$

where M is an alkali metal such as sodium, potassium, lithium, etc.). It is indeed surprising that $CF_4$ is not the end product of this reaction in view of the effect of fluorine on other nitroalkanes as discussed above. It is also unexpected that other fluorinating agents, such as perchloryl fluoride, for example, cannot be used in this invention.

The procedure by which the compounds of this invention are prepared is quite straightforward in technique. The polynitroalkane salt is dissolved in water, the solution stirred and elemental fluorine diluted with an inert gas is then slowly passed into the solution. In the procedure for trinitromethane, the product is volatile and is removed from the reaction zone to a cold trap (Dry Ice-acetone is satisfactory) where it is condensed and solidified. When 1.1-difluoronitroethane is the product, the reaction mass is separated into two layers, the heavier oily layer being the product which is simply separated, dried and distilled.

The process proceeds readily at atmospheric or reduced pressures (say from 760 mm. to 25 mm.) and with fluorotrinitromethane a slightly reduced pressure is favored in order to assist removal of the product vapors. The effluent inert gas diluent may be passed through a scrubber (e.g. caustic), collected and recycled if it is expensive (e.g. helium, argon, krypton, neon, etc.), but less expensive dry nitrogen is also useful.

The concentration of the water solution of the alkali metal polynitroalkane salt is not critical, but for economy a saturated solution (about 3% to 5% at 0° C.) is preferred. Excess undissolved salt may be present and it is convenient to have 10% to 20% by weight in excess in the aqueous phase where it goes into solution as required by the process. Usually the process will be operated at about 0° C., but temperatures from about —5° C. to about 15° C. are operable, higher temperatures being undesirable because of the tendency for by-products to form. The optimum temperature is the lowest obtainable without freezing the water solvent.

As indicated, any alkali metal salt of the polynitroalkane may be used, but because of economy and availability the potassium salt will be preferred. These alkali metal salts are prepared by the method of Marans and Zelinsky (J. Am. Chem. Soc. 72 5329, 1950).

An alternate procedure for carrying out the process in the case of fluorotrinitroethane involves preparation of the alkali metal salt by reaction of an alkali metal hydroxide with tetranitromethane and subsequent reaction with fluorine in situ without isolation of the salt. Thus, one mole of tetranitromethane and 2 moles of KOH, for example, are simply stirred until the tetranitromethane dissolves completely and then the diluted fluorine is passed into the reaction vessel. This technique is desirable because it eliminates the step of isolating the alkali metal salt.

The concentration of fluorine in the inert gas is not critical and may vary widely, being usually between about 5% and 50% by volume with 10% to 30% fluorine by volume being the preferred concentration of the inlet vapors. It is also desirable that the rate of addition of fluorine be adjusted so that there is little or no unreacted fluorine in the gas phase above the aqueous liquid in the reaction vessel. A suitable rate of fluorine flow for making fluorotrinitromethane is about 0.5 to about 0.1 parts of fluorine per hour per part of nitro compound. This is advantageous in that it avoids reaction of any excess fluorine with the fluorotrinitromethane product which could result in replacement of nitro groups in accord with the prior art teachings. In the process for 1,1-difluorotetranitroethane, however, fluorine flow rates of 1 to 5 parts of fluorine per hour per part of nitro compound may be used. Completion of the reaction is easily determined by the change in color from the beginning yellow solution to colorless. The exit gases may also be tested for fluorine with starch-iodide paper to determine if the reaction is completed.

The method of using oxidizers for propellants is well known and the compositions of this invention may be used in the conventional manner using the techniques normally employed where liquid oxidizers (e.g. nitric acid) are used. Reference is made to U.S. 2,898,733 and U.S. 2,898,735 where such techniques are described in detail.

Example 1.—Peparation of F—C—(NO₂)₃

Potassium trinitromethane as obtained by reaction of 40 g. of tetranitromethane with 45 g. of potassium hydroxide in 50 g. of 1:1 glycerine and water was filtered, washed several times with cold water and then dissolved in 500 ml. of water without further purification. This solution was cooled at 0° C. in an ice-water bath and a mixture of fluorine (10%) in helium was passed in by means of a sub-surface inlet tube at a slow rate delivering approximately 2 g. of fluorine per hour (i.e. 0.5 parts F₂ per part of nitro compound). An outlet directly above the water level in the reaction vessel was connected to a series of three cold traps at 0° C., −78° C. and −196° C., the outlet of the last trap was vented to the atmosphere. The vent gases were tested for free fluorine periodically with starch-iodide paper and none observed during the first four hours. At the end of this period the yellow reaction solution was colorless and within a few minutes free fluorine was detected in the venting gas. The flow fluorine was shut off and the system flushed with helium. Only a small amount of water was collected in the trap at 0° C. The trap at −196° C. contained a fraction of one gram of CF₄ identified by infrared analysis. The trap at −78° C. contained a white solid which melted on warming to room temperature. The colorless liquid, insoluble in and heavier than water, was washed twice with an equal volume of water and dried over anhydrous magnesium sulfate.

Distillation at atmospheric pressure gave 23 g. of pure, colorless fluorotrinitromethane; B.P. 87–88° C.; F.P. −29° C.; $n_D^{25}$ 1.3915; sp. g. 25/25, 1.586. Yield: 67% (based on the tetranitromethane).

The infrared spectrum showed typical NO₂ and C—F bonding. Vapor-liquid chromatography indicated a purity of 99.4 mole percent.

*Analysis.*—Calc. for CFN₃O₆: C, 7.10; H, none; F, 11.23; N, 24.85. Found: C, 7.40; H, none; F, 11.47; N, 24.44.

Fluorotrinitromethane is useful as a storage stable oxidizer for high energy propellant systems, its stability being surprisingly high in view of its structure. CF(NO₂)₃ required an impact energy of 140 kilogram centimeters to detonate, thus indicating its relative high stability. Test conditions used were those of JANAF Panel on Liquid Propellant Test Methods, recommended Test No. 4. Fluorotrinitromethane becomes more sensitive when mixed with fuels. For example, a 50% by weight mixture with toluene explodes at 100 kg. cm.

Heat of formation of FC(NO₂)₃ is calculated as −37.3±2.1 kcal. per mole based on measured heats of combustion with carbon monoxide gas. When used as an oxidizer with hydrazine as a propellant fuel its specific impulse is 286 lb.-sec./lb., under conditions of shifting equilibrium in the exhaust gases, a pressure ratio of 1000 p.s.i. to 14.7 p.s.i., and a molar ratio of oxidizer to fuel of 0.4. The mixture has a bulk density impulse of 376 g.-lb.-sec./cm.³-lb. under the same conditions. (Bulk density impulse=specific impulse×bulk density of propellants.)

Example 2.—Preparation of potassium trinitromethane in situ

A solution of 2 parts by weight of tetranitromethane in 100 parts of water containing 1.2 parts of KOH was prepared and cooled to 0° C. Then a mixture of 1 part by volume of fluorine to 3 parts by volume of nitrogen was passed into the solution as in Example 1. The product fluorotrinitromethane was recovered as in Example 1 in 67% yield.

Example 3.—Preparation of F—C(NO₂)₂—C(NO₂)₂F

A solution of five parts by weight of $$K_2^{++}[C(NO_2)_2—C(NO_2)_2]^=$$

in 150 parts of water was prepared and cooled to 0° C. Then a gaseous mixture of 30% by volume of fluorine in helium was passed into the stirred solution at a rate of about 1.0 part by weight of fluorine per hour. After 2.5 hours the originally yellow solution was colorless and a colorless oil separated out to form a lower layer. The oil was separated, washed twice with water, dried over anhydrous magnesium sulfate and then vacuum distilled to yield 2.5 parts (58%) of pure colorless liquid 1,2-difluorotetranitroethane; B.P. 60° C. (35 mm.); $n_D^{25}$ =1.4160; density 1.702 g./ml. (25° C.).

*Analysis.*—Calcd. for C₂F₂N₄O₈: C, 9.75; H, 0.0; F, 15.45; N, 22.76. Found: C, 9.81; H, 0.0; F, 15.54; N, 22.65.

The infrared spectrum showed typical —NO₂ bands at 6.12μ and 7.52μ and C—F bands at 7.70μ and 7.91μ.

As with fluorotrinitromethane, 1,2-difluorotetranitroethane is a storage stable oxidizer. It is shock insensitive at 145 kg.-cm. (impact energy). Used as a bipropellant oxidizer with hydrazine fuel, its specific impulse is estimated at 278 lb.-sec./lb. and its bulk density impulse is 392 g. sec./cm.³-lb. under the conditions given in Example 1. Heat of combustion for 1,1-difluorotetranitroethane is calculated from measured heats of combustion measurements with CO gas as −90.5±5.6 kcal./mole.

Example 4.—Additional performance data

The following table gives performance data for fluorotrinitromethane and 1,1-difluorotetranitroethane with several fuels as calculated for conditions of shifting equilibria in the exhaust gases and of a pressure ratio of 1000 p.s.i. to 14.7 p.s.i.

| Fuel | Fluoronitromethane | | | 1,2-difluorotetranitroethane | | |
|---|---|---|---|---|---|---|
| | Oxidizer/ fuel molar ratio | Specific impulse (lb.-sec./lb.) | Bulk density impulse (g.-sec./ cm.³-lb.) | Oxidizer/ fuel molar ratio | Specific impulse (lb.-sec./lb.) | Bulk density impulse (g.-sec./ cm.³-lb.) |
| Unsymmetrical dimethyl hydrazine | 1.4 | 280 | 367 | 1.2 | 273 | 387 |
| Refined kerosene | 0.5 | 272 | 392 | 0.5 | 266 | 415 |

It is of interest to note that these density impulse values are exceeded only by ClF₃ and F₂ with the same fuels.

It will be understood that numerous changes may be made from the above description and examples without departing from the spirit and scope of the invention.

We claim:
1. 1,1-difluorotetranitroethane.
2. The process of making fluoronitroalkanes having the structural formula

where X is a radical selected from the group consisting of —NO₂ and

radicals which comprises reacting elemental fluorine with a compound having the structural formula

where M is an alkali metal and Z is a radical selected from the group consisting of —NO$_2$ and

radicals, said process being carried out at a temperature between about —5° C. and about 15° C.

3. The process of claim 2 where the alkali metal is potassium.

4. The process of making fluorotrinitromethane which comprises reacting an alkali metal salt of trinitromethane with elemental fluorine at a temperature between about —5° and 15° C.

5. The process of making fluorotrinitromethane which comprises reacting an aqueous solution of potassium trinitromethane with elemental fluorine at a temperature between about —5° and 15° C. and removing the product from the reaction zone in vapor form.

6. The process of making fluorotrinitromethane which comprises contacting at —5° to 10° C. an aqueous solution of potassium trinitromethane with vapors of elemental fluorine diluted with an inert gas and removing vapors of the product from the reaction zone.

7. The process of making fluorotrinitromethane which comprises contacting with vapors of elemental fluorine diluted with an inert gas an aqueous solution of potassium trinitromethane held at a temperature between about —5° and about 15° C. and prepared in situ by reacting about two moles of KOH with about one mole of tetranitromethane and removing vapors of the product from the reaction zone.

8. The process of making 1,1-difluorotetranitromethane which comprises contacting at about —5° to about 10° C. an aqueous solution of 1,1-dipotassium tetranitroethane with vapors of elemental fluorine diluted with an inert gas.

9. Method of preparing fluorotrinitromethane which comprises reacting fluorine with a compound of the formula

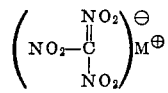

wherein M is an alkali metal cation, in the presence of water.

References Cited

Noble et al., Chem. Reviews, vol. 64, pp. 20 to 27, 48, 50 and 54 to 57 (1964).

LELAND A. SEBASTIAN, *Primary Examiner.*

U.S. Cl. X.R.

149—36, 88

U.S. DEPARTMENT OF COMMERCE

PATENT OFFICE

Washington, D.C. 20231

UNITED STATES PATENT OFFICE
CERTIFICATE OF CORRECTION

Patent No. 3,441,619                                April 29, 1969

David M. Gardner et al.

It is certified that error appears in the above identified patent and that said Letters Patent are hereby corrected as shown below:

Column 4, line 57, "1,1-difluorotetranitroethane" should read -- 1,2-difluorotetranitroethane --. Column 6, line 6, "1,1-difluorotetranitromethane" should read -- 1,1-difluorotetranitroethane --.

Signed and sealed this 14th day of April 1970.

(SEAL)
Attest:

Edward M. Fletcher, Jr.

Attesting Officer

WILLIAM E. SCHUYLER, JR.

Commissioner of Patents